US012056230B2

(12) United States Patent
Kaidi et al.

(10) Patent No.: US 12,056,230 B2
(45) Date of Patent: Aug. 6, 2024

(54) SPLIT ONE-TIME PASSWORD DIGITS FOR SECURE TRANSMISSIONS TO SELECTED DEVICES

(71) Applicant: PAYPAL, INC., San Jose, CA (US)

(72) Inventors: George Chen Kaidi, Singapore (SG); Antony Amalraj Morais, Chennai (IN)

(73) Assignee: PAYPAL, INC., San Jose, CA (US)

( * ) Notice: Subject to any disclaimer, the term of this patent is extended or adjusted under 35 U.S.C. 154(b) by 198 days.

(21) Appl. No.: 17/481,162

(22) Filed: Sep. 21, 2021

(65) Prior Publication Data

US 2023/0093143 A1  Mar. 23, 2023

(51) Int. Cl.
| | |
|---|---|
| *H04L 29/06* | (2006.01) |
| *G06F 21/31* | (2013.01) |
| *G06F 21/46* | (2013.01) |
| *H04L 9/06* | (2006.01) |
| *H04L 9/40* | (2022.01) |

(52) U.S. Cl.
CPC .............. *G06F 21/46* (2013.01); *G06F 21/31* (2013.01); *H04L 9/0643* (2013.01); *H04L 63/0838* (2013.01); *H04L 63/0846* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 8,832,807 B1* | 9/2014 | Kuo | ...................... | G06F 21/41 |
| | | | | 726/8 |
| 9,147,063 B1* | 9/2015 | Florissi | ................... | G06F 21/34 |
| 9,191,198 B2* | 11/2015 | Harrison | ............... | H04L 9/3226 |
| 10,536,269 B2* | 1/2020 | Dolev | .................... | H04L 9/3026 |
| 11,003,760 B2* | 5/2021 | Machani | ............ | H04L 63/0861 |
| 2006/0206919 A1* | 9/2006 | Montgomery | .......... | G06F 21/40 |
| | | | | 726/2 |
| 2009/0125997 A1* | 5/2009 | Cook | .................. | H04L 63/0853 |
| | | | | 726/6 |
| 2011/0113245 A1* | 5/2011 | Varadarajan | ............ | G06F 21/34 |
| | | | | 713/168 |
| 2011/0302421 A1* | 12/2011 | Harrison | ............... | H04L 9/3271 |
| | | | | 713/180 |

(Continued)

*Primary Examiner* — Jeffery L Williams
(74) *Attorney, Agent, or Firm* — Haynes and Boone, LLP

(57) ABSTRACT

There are provided systems and methods for split one-time password digits for secure transmissions to selected devices. Authentication credentials and one-time password operations by a service provider, such as an electronic transaction processor for digital transactions, may be compromised by malicious computing attacks or other actions that compromise the security of data and communications. To increase security of the data within a communication and authentication operations, a split one-time password system may be implemented. A user may preset a number of known digits for a one-time password with a profile and/or account. When multifactor authentication is required, randomized digits may be generated using a hash algorithm and may be transmitted to the user with instructions for completion of the one-time password. The user may be required to specifically enter the known digits with the randomized digits to properly pass the multifactor authentication.

20 Claims, 6 Drawing Sheets

(56) References Cited

U.S. PATENT DOCUMENTS

| | | | | |
|---|---|---|---|---|
| 2014/0304789 | A1* | 10/2014 | Kaplan | H04L 63/0838 |
| | | | | 726/5 |
| 2019/0104118 | A1* | 4/2019 | Wu | H04L 9/0897 |
| 2022/0045852 | A1* | 2/2022 | Isshiki | H04L 9/3247 |
| 2023/0093143 | A1* | 3/2023 | Kaidi | H04L 9/0643 |
| | | | | 726/6 |
| 2023/0224148 | A1* | 7/2023 | Newton | H04L 9/0869 |
| | | | | 380/278 |
| 2023/0350729 | A1* | 11/2023 | Wilkinson | H04L 67/1008 |

* cited by examiner

US 12,056,230 B2

SPLIT ONE-TIME PASSWORD DIGITS FOR SECURE TRANSMISSIONS TO SELECTED DEVICES

TECHNICAL FIELD

The present application generally relates to digital data security and more particularly to splitting alphanumeric character creation and entry for one-time passwords during multi-factor authentication operations.

BACKGROUND

Online service providers may provide services to different users, such as individual end users, merchants, companies, and other entities. When providing these services, the service providers may provide an online platform that may be accessible over a network. In order to access the computing services and/or digital accounts, users may be required to be authenticated, such as by entering a username, password, personal identification number (PIN) or the like. To provide enhanced authentication, multifactor authentication may be used, where additional pieces of data that serve as evidence that the user is present and/or properly valid and identified (e.g., the user is who they present to be). This may include data associated with knowledge of the user, possessions of the user, and/or inherence of the user's identifier. In this regard, two-factor authentication may be used by providing a one-time password through different types of electronic communications including text messages, emails, instant messages, push notifications, and the like. However, as hackers and other malicious users or entities become more sophisticated, they may perform different computing attacks and other malicious conduct to compromise these communications. Thus, service providers require more robust and sophisticated manners of securing passwords and other confidential data communications to prevent breach and use by undesired or unintended entities.

Figure 1:
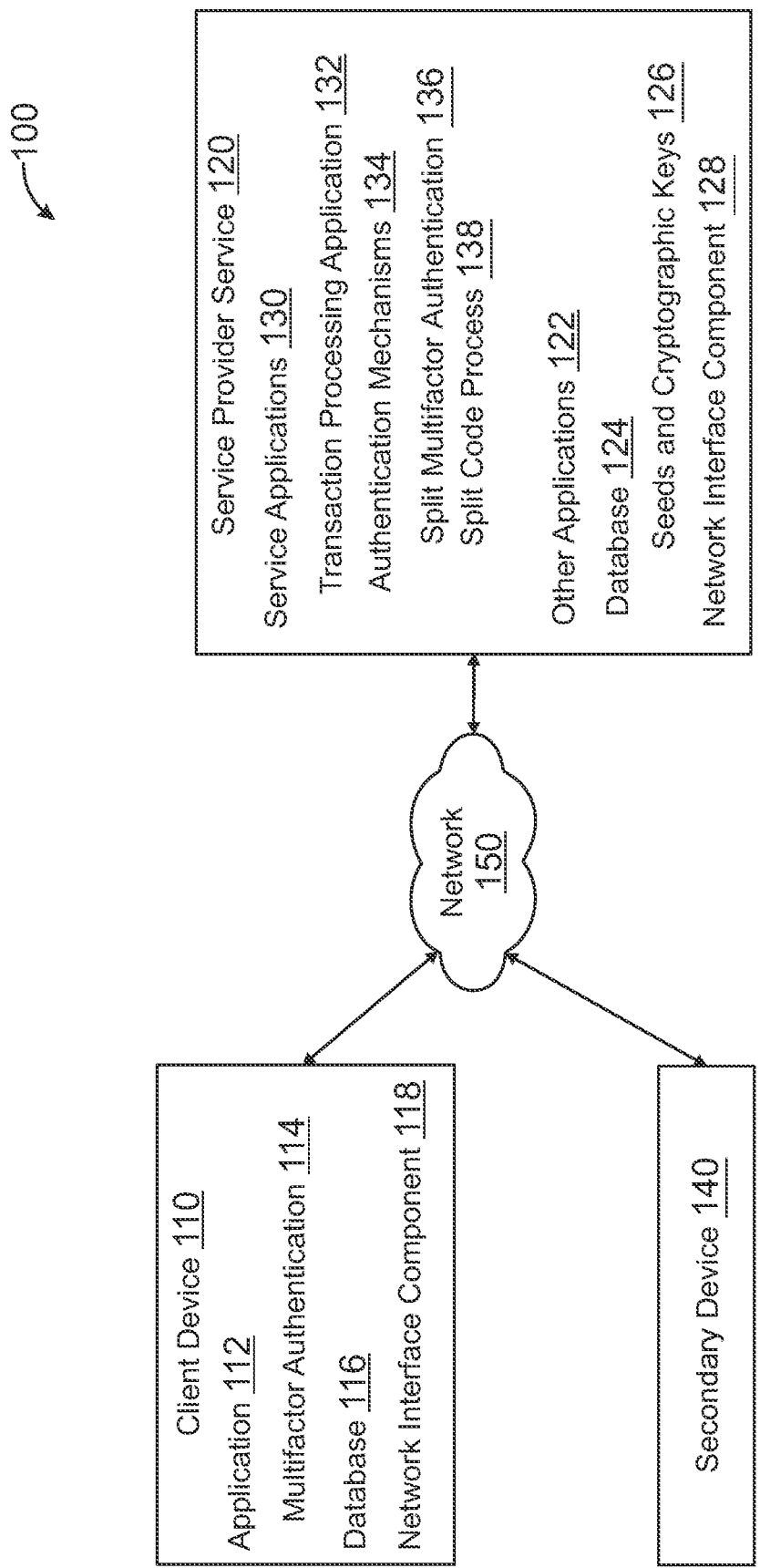
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for using split one-time password digits for secure transmissions to selected devices. Systems suitable for practicing methods of the present disclosure are also provided.

In network communications, such as between online platforms and systems for service providers and end users' client devices, electronic communications and other network computing architecture may face different types of computing attacks coming from malicious sources over a network. A bad actor may initiate a computing attack on the computing environment of the service provider, such as an eavesdropping attack, a password attack and/or account takeover, a web abuse (e.g., account enumeration, brute force attacks, SQL injection), or other type of computing attack that may compromise electronic communications, such as exposing data contained in the electronic communications to the bad actor. During multifactor authentication, these computing attack may introduce risk to one-time passwords (OTPs) used for the multifactor authentication to further secure account or user credentials and provide access to a digital account and/or computing services, which may lead to fraud and loss during account takeovers, fraudulent electronic transaction processing, access and/or performing online banking and/or account and fund balance management, and the like. This may occur when malicious actors and other fraudulent entities gain access to a mobile device or secondary device that may receive OTPs, these devices are hacked or become compromised, and/or subscriber identify/identification module (SIM) card swapping and/or theft occurs. Additionally, where other communications instead of SMS/MMS text messaging is used to send an OTP, such as email, push notification, instant messaging, or the like, other computing attacks may similarly compromise these communication channels and messages.

In order to assist in preventing or minimizing these computing attacks and other abuses of a service provider during multifactor authentication, a split OTP system may be implemented by the service provider. In this regard, the service provider may request that a valid user, such as one that has been authenticated and is validly accessing a digital account and/or utilizing services of the service provider, establish a pre-established set of alphanumeric characters and/or digits. Alphanumeric characters are referred to herein as a "digit" or "digits," which may correspond to alphanumeric characters, numbers, symbols, and the like in one or more languages that may be input for an OTP using a computing device, mobile phone, secondary device, or the like. This may be a set number and/or portion of digits used for future OTPs for entry with a randomly generated number or portion of digits for the future OTPs generated at the time of the two- or multi-factor authentication requests using the OTPs. These digits may be stored to a profile or other data for the user's account.

Thereafter, when a multifactor authentication request occurs, such as for access to the user's account, use of the user's account (e.g., in electronic transaction processing or to view/utilize data and/or balances for the user's account), and/or changing of data, preferences, and credentials for the account, a randomly generated set of digits is created by the service provider. This is sent to the user's designated device, and the user is requested to enter the randomly generated set of digits with the pre-established set of digits for the user's profile or account as the OTP for the multifactor authentication request and process. Matching may then be performed to determine if the OTP is properly entered and valid, and a determination of whether to authenticate the user may be processed and performed. While use of OTPs are used to describe various embodiments herein, passwords are not limited to OTPs and other types of passwords, such as multi-use passwords, can be used.

For example, a service provider may provide electronic transaction processing to entities through digital accounts, including consumers and merchants that may wish to process transactions and payments. Other service providers may also provide computing services, including email, social networking, microblogging, media sharing, messaging, business and consumer platforms, etc. In order to establish an account, these different users may be required to provide account details, such as a login, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, and/or other information. The entity may also be required to provide financial or funding source information, including payment card (e.g., credit/debit card) information, bank account information, gift card information, benefits/incentives, and/or financial investments, which may be used to process transactions. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments, electronic transaction processing services, and/or other computing services.

However, malicious users, entities, and/or other computing devices (e.g., computing devices that may include malware, viruses, and the like that may be hijacked to automate computing attacks) may attempt to abuse electronic communications including OTPs to perform account takeovers and other malicious actions, which may lead to exploitation and/or unauthorized use of these accounts and/or account data by these malicious parties. Thus, a service provider may utilize multifactor authentication processes and operations to further secure accounts. Multifactor authentication may enhance authentication operations by having the user enter additional data or pieces of evidence during authentication to verify that the user is present and who they are purporting to be. In this regard, multifactor authentication may be done by having a user provide an alphanumeric and/or symbolic code, password, or the like that is randomly generated at the time of authentication for the multifactor authentication request and process. This may correspond to an OTP, which may be sent to the user through a trusted device that should be in possession of the user.

In order to provide additional security for multifactor authentication operations of the service provider, the service provider may further provide split OTP processes and operations. The user may establish a set of digits that are static (at least for a length of time or expiration time period) and are stored with the user's profile and/or account with the service provider. The user may establish a number of digits for the set, such as one to three digits, however, other lengths of digits may be used as requested by the user and/or set for the multifactor authentication system. For example, the user may set their known code as 25 or 010, or a text password may be used for the known code including randomized letters, such as "kwj," or different words, names, or any combination thereof. The pre-established digits of the known code for the user may then be stored and the user may be allowed to update their known code via their user profile and/or account, such as in a profile or account dashboard and/or security interface.

The service provider may then receive an authentication request for the user's account and/or using the user's account with the service provider, for example, to engage in electronic transaction processing for payments, transfers, or access to content. The service provider may determine that the authentication request requires multifactor authentication or multifactor authentication is requested for the authentication request. This may include using a two-factor authentication (or additional factor, where established) by providing back an OTP having a randomized portion generated for the two-factor authentication by the service provider and the pre-established known portion from the user and stored with the user's account. The service provider may generate the randomized portion of the OTP. In this regard, a key or seed value may be used as input to a randomization algorithm, such as a hash algorithm or function that performs hashing on the key or seed. In some embodiments, this may include a Hashed Message Authentication Code (HMAC) or other MAC-family algorithm used with a cryptographic key and/or seed value to randomize a number of digits. Another hash or other randomization algorithm or function may also be used to generate the randomized portion of the OTP by the service provider.

Once generated, the randomized set of digits for one portion of the OTP may then be used to determine one or more placements of the pre-established known portions or code from the user to the OTP, which may be used for the multifactor authentication. For example, the service provider may utilize one or more placement rules, strategies, and/or user preferences to determine where the known portion or code by the user should be entered or placed in the OTP with the randomized portion. This may generate a "split" OTP that includes a known portion and a randomized portion. The strategy for a "split" OTP may include removing a portion or number of digits from the randomized portion and having the user replace that portion with the digits of the known portion or code. The placements of removed digits may be consecutive or may be non-consecutive and the user may be required to separate the known code into the non-consecutive placements (e.g., by placing 2 and 5 for a known code of 25 into their correct order in an OTP showing 13*8*5 to obtain 132855). Although the term "split" is used in reference to the OTP generation and entry operations discussed throughout, it is understood that split OTPs may not correspond to two or more separate pieces of an OTP that are processed and verified separately. Instead, the password or OTP may be processed as an entire or whole string in a single operation in order to maintain the integrity of the OTP and prevent computing attacks, such as a side channel attack that may infer the known piece, that may compromise one or more portions of the OTP.

In other embodiments, the user may select the placements and may remove specific digits of the randomized portion to be replaced with the known portion from the user. The removed digits' placements may be predetermined or may be selected by the user at the time of receiving the randomized portion. Further, the randomized portion may correspond to a subset of the digits for the OTP, or the multifactor authentication process may be capable of accepting and processing larger amounts of digits than the randomized portion. The user may append, prepend, enter into an interior section of the randomized portion, or any combination thereof to generate an OTP having a number of digits for the randomized portion and the known portion. This may include adding characters of a password to the randomized portion. Instructions for how to enter the known portion or code into placements with the randomized portion or code may be generated to be provided to the selected computing device of the user with the randomized portion for generation of the OTP.

Thereafter, the service provider may transmit an electronic communication (e.g., an SMS text message or the like) having the randomized portion and instructions for completing and entering the OTP to one or more accounts, email addresses, device identifiers, phone number or text message identifiers, or the like of the user. However, eavesdropping attacks and other malicious network spying or listening attackers may receive information for the electronic communication by monitoring network communications. For example, an eavesdropping attack may monitor portions of the electronic communication, SIM attacks and swapping may allow malicious parties to receive these communications, and the like. Thus, use of the pre-established known identifier further protects the electronic communication transmitting the OTP and/or the randomized portion or code of the OTP with instructions to complete the OTP from these malicious parties.

In this regard, the service provider may receive a response to the multifactor authentication request having an entered OTP. The service provider may process the OTP to determine if the OTP properly authenticates the user and/or authentication request and matches the randomized and known portions for a correct OTP. If the OTP includes the correct randomized and known portions, as well as in the correct placements and/or orders in the OTP, the user and/or device requesting the multifactor authentication may be authenticated. This may include using the rule, strategy, and/or preference for OTP creation and entry using the randomized and known portions to determine if the OTP is properly entered using the randomized and known portions. However, if not, the user may be retested, for example, by requesting re-entry of the OTP using the previous randomized portion and previous instructions (with the known portion) or a new randomized portion and instructions for OTP entry with the known portion. In some embodiments, if the authentication fails using the OTP and/or if a number of failed authentications occur, an administrator, authority, and/or the user (e.g., via another communication channel or device) may be notified and alerted of potential fraud. Further, if a number of failed multifactor authentications occur in a time period and/or a validity term expires or is detected (e.g., an expiration date) occurs for the known portion, the user may be required to go through step-up authentication and recreation of the known portion.

In some embodiments, split OTPs may also be used during phone calls or other voice communication sessions. For example, a user may receive a phone call from a party, automated or interactive voice response system, or the like that purports to be a known entity or another known user, such as a call from an assistance hotline, a bank or financial service provider alerting of fraud, and the like. In order to authenticate the caller so that the callee user is not subject to fraud, scams, and other malicious voice communications, the user may validate the identity of the caller by visiting a trusted website and/or application interface of the corresponding service provider for the caller. The user may then access a process to enter an OTP or other code that is securely provided to the service provider. The service provider may include a backend channel to transmit the OTP to the caller. If the caller is able to repeat the OTP back to the user, then the user may trust the caller. In other embodiments, the caller may provide, or the user may visit, a trusted weblink or trusted phone number via text message during the call, which may allow the user to contact the service provider and receive a verification of the caller's identity and/or an OTP required from the caller to verify their identity. During any additional calls, the caller may be put on hold by the user so that an identity and/or OTP may be received from another phone call.

Thus, in various embodiments described herein, service providers may provide increased security during multifactor authentication used for various purposes for online and digital data security. This provides increased trust in devices that are capable of passing the additional multifactor authentication techniques described herein. This prevents compromising of data through malicious computing attacks and unauthorized transmissions from occurring, thereby preserving the data for security concerns. Further, the service provider may reduce and/or prevent eavesdropping attacks, SIM swapping, and the like, which cause increasing amounts of fraud and computing attacks due to the proliferation of mobile devices and other mobile technologies.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110, a service provider server 120, and a secondary device 140 in communication over a network 150. Client device 110 may be utilized by a user to receive communications over network 150, where service provider server 120 may provide various data, operations, and other functions over network 150 to provide services to users and devices. Secondary device 140 may correspond to another device associated with a user utilizing client device 110. In this regard, client device 110 and/or secondary device 140 may be used to receive messages during multifactor authentication, including a text, SMS message, or the like that includes a randomized portion and instructions for completing and entering an OTP using a known portion during the multifactor authentication. Service provider server 120 may transmit the electronic communication and a corresponding OTP may be received back for processing.

Client device 110, service provider server 120, and secondary device 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user over network 150, which may include utilizing computing services from service provider server 120 that may require authentication including multifactor authentication operations using OTPs. Further, application 112 may enable receiving and displaying messages and electronic communications from service provider server 120 that may include randomized portions of OTPs for use with known portions based on received instructions. In this regard, application 112 may correspond to specialized software utilized by a user of client device 110 that may be used to access a website or user interface that may correspond to the computing services provided by service provider server 120. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information (e.g., a website for an email provider or other messaging service), presenting the website information to the user, and/or communicating information to the website. However, in other embodiments, application 112 may include a dedicated application of service provider server 120 or other entity (e.g., an email provider or messaging service).

Application 112 may be associated with digital payment accounts, account information, user financial information, and/or transaction histories, which may be associated with electronic transaction processing services provided by service provider server 120. Such services may require authentication and/or login processes, such as by entering a username, password, PIN, or the like. The authentication processes may include a multifactor authentication process 114, for example, using OTPs or other codes that are generated as discussed herein. However, in further embodiments, different services may be provided via application 112, including social networking, media posting or sharing, microblogging, data browsing and searching, online shopping, and other services available through service provider server 120 that may be utilized via multifactor authentication using OTPs. When using application 112, an electronic communication may be received by client device 110 and/or secondary device 140 that includes a randomized portion generated by service provider server 120 and instructions to complete and enter the OTP properly using a known portion associated with the corresponding account, user, and/or device. The randomized portion may be entered to multifactor authentication 114 with the known portion, for example, with or after entering authentication credentials (e.g., username, email, password, PIN, etc.), and may be transmitted to service provider server 120 for processing. Access may be granted if the OTP is properly entered and authenticated, or instead application 112 may require a retesting of multifactor authentication 114 and OTP entry process.

Client device 110 may further include a database 116 stored on a transitory and/or non-transitory memory of client device 110, which may store various applications and data and be utilized during execution of various modules of client device 110. Database 116 may include, for example, identifiers such as operating system registry entries, cookies associated with application 112 and/or other applications, identifiers associated with hardware of client device 110, or other appropriate identifiers, such as identifiers used for payment/user/device authentication or identification, which may be communicated as identifying the user/client device 110 to service provider server 120. Moreover, database 116 may store electronic communications received from service provider server 120, including SMS/MMS text messages and other data for communications that may be associated with multifactor authentication operations and the like.

Client device 110 includes at least one network interface component 118 adapted to communicate with service provider server 120 and/or secondary device 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide computing services and operations via one or more digital platforms, applications, websites, and the like. Service provider server 120 may provide multifactor authentication operations and transmissions of electronic communications including texts for OTPs. In this regard, service provider server 120 includes one or more processing applications which may be configured to interact with client device 110 to process multifactor authentications. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes service applications 130, other applications 122, a database 124, and a network interface component 128. Service applications 130 and other applications 122 may correspond to executable processes, procedures, and/or applications with associated hardware. In other embodiments, service provider server 120 may include additional or different modules having specialized hardware and/or software as required.

Service applications 130 may correspond to one or more processes to execute modules and associated specialized hardware of service provider server 120 to process a transaction or provide another computing service to customers and/or end users of service provider server 120, which may utilize multifactor authentication for access to and use of digital accounts and computing services. In some embodiments, service applications 130 may correspond to specialized hardware and/or software used by a user associated with client device 110 to establish a payment account and/or digital wallet, which may be used to generate and provide user data for the user, as well as process transactions. In various embodiments, financial information may be stored to the account, such as account/card numbers and information. In this regard, the user may further set authentication information, including account credentials (e.g., username, email address or other contact identifier, password, PIN, and the like). The authentication information may further include one or more pre-established known OTP portions, which may be set by the user for multifactor authentication via OTPs. Where multiple known portions are set, each may have a different number of digits or different alphanumeric characters and symbols, which may be rotated through or randomly used for OTPs to provide additional account security.

A digital token for the account/wallet may be used to send and process payments, for example, through an interface provided by service provider server 120. The payment account may be accessed and/or used through a browser application and/or dedicated payment application executed by client device 110 and engage in transaction processing through service applications 130. Service applications 130 may process the payment and may provide a transaction history to client device 110 for transaction authorization, approval, or denial. For example, transaction processing application 132 of service applications 130 may be utilized to perform the aforementioned account and electronic transaction processing operations. However, in other embodiments, service applications 130 may instead provide different computing services, including social networking, microblogging, media sharing, messaging, business and consumer platforms, etc.

In this regard, when utilizing transaction processing application 132 and/or one or more other applications of service applications 130, authentication may be required, which may be performed through one or more multifactor authentication operations or processes. Authentication mechanisms 134 may include these authentication operations and processes, which may include a multifactor authentication process using split OTPs. Authentication mechanisms 134 may include a split multifactor authentication 136 that provides processes to initiate and process multifactor authentication OTPs that include a randomized portion from service provider server 120 and a static, pre-established, and/or known portion from a user and stored with an account and/or account profile of the user with service provider server 120.

Split multifactor authentication 136 may be initiated in response to an authentication request, which may be determined to require multifactor authentication (e.g., two-factor authentication using authentication credentials and an OTP) or requested to use multifactor authentication. Thereafter, a split code process 138 may be executed to determine a randomized portion, set of number, and/or code for the OTP, which is integrated with a known portion that is pre-established by the user for their account and known to the user prior to OTP entry and processing using the randomized portion. Split code process 138 may generate the randomized portion using a hashing function or algorithm, such as HMAC or another MAC-based algorithm. Further, a seed value and/or cryptographic encryption or security keys may be used for the randomized portion, such as seeds and cryptographic keys 126 stored by database 124. This allows for randomization of the output digits for the randomized portion or code to a higher and more variable degree. The randomized portion may correspond to a two, four, six, or eight-digit set (e.g., of alphanumeric characters and/or symbols), or may correspond to another number of digits based on the corresponding authentication system and acceptable inputs.

Split code process 138 may then determine a rule, strategy, and/or user preference that is used to place or add the known portion of the OTP by the user to the OTP with the randomized portion. A rule or strategy may be randomly picked and/or rotated through or may be preset by service provider server 120 for split multifactor authentication 136. Further, the user setting the known portion may also establish user preferences for how the user would like to enter the known portion with the randomized portion. This may include removing digits of the randomized portion for entry of the known portion, replacement of digits in the randomized portion, prepending and/or appending digits to the front and/or back of the randomized portion, and/or adding password characters or digits in placements within, to the front, or to the end of the randomized portion. Determination of the rule, strategy, and/or user preference for placement of the known portion of the OTP with the randomized portion is discussed in more detail with regard to FIGS. 2 and 3A of the present disclosure.

Once the randomized portion and/or instructions for completion of the OTP is generated, the randomized portion may be transmitted to a selected device for the user. The selected device may correspond to client device 110 or may instead correspond to secondary device 140 designated to receive the message or communication having the randomized portion and/or instructions. In this regard, secondary device 140 may correspond to a mobile smart phone, wearable computing device, device of a family or trusted user, work device, or the like, which may be designated to receive the communication for added security. Split multifactor authentication 136 may provide digital electronic communications, such as text messages, emails, network messages and communications, push notifications, and the like, having the randomized portion for the OTP. In some embodiments, the communications may further include instructions for combining the randomized and known portions; however, the instruction may also be known to the user where previously set as a user preference. Thus, split multifactor authentication 136 may use an identifier for a telephone number and account, an email account, a messaging account, or a social networking account in order to transmit the communications.

After receiving a response from client device 110 (e.g., through multifactor authentication 114 in application 112) that includes an OTP, split multifactor authentication 136 may determine whether the OTP includes the randomized portion and the known portion, including if the two portions are properly entered in corresponding placements for the OTP (e.g., are not just randomly placed and not properly entered or aligned). If the OTP is properly entered having the proper placements of the randomized and known portions, authentication mechanisms 134 may approve authentication and provide the corresponding access and/or computing services. However, if not, authentication mechanisms 134 may retest the user via client device 110 and/or secondary device 140, including use of split multifactor authentication 136 to request reentry of the OTP using the previously provided and/or newly generated randomized portion, instructions, and known portion, or using another multifactor authentication process. In other embodiments, an alert may be generated for the user or another fraud prevention user, for example, after failing a number of multifactor authentication attempts. Further, if a number of failures occur during a time period, the user may be requested to update and/or reset their known portion(s) for OTPS.

In various embodiments, service provider server 120 includes other applications 122 as may be desired in particular embodiments to provide features to service provider server 120. For example, other applications 122 may include security applications for implementing server-side security features, programmatic client applications for interfacing with appropriate APIs over network 150, or other types of applications. Other applications 122 may contain software programs, executable by a processor, including one or more GUIs and the like, configured to provide an interface to the user when accessing service provider server 120, where the user or other users may interact with the GUI to more easily view and communicate information. In various embodiments, other applications 122 may include additional connection and/or communication applications, which may be utilized to communicate information to over network 150.

Additionally, service provider server 120 includes database 124. Database 124 may store various identifiers associated with client device 110 and/or secondary device 140. Database 124 may also store account data, including payment instruments, financial information, account balances, and authentication credentials, as well as transaction processing histories and data for processed transactions. The authentication credentials may include pre-established portions for OTPs set by and known to users, as well as preferences for use of the pre-established portions. Database 124 may store information or other data generated and stored by other applications 122. Database 124 may also include seeds and cryptographic keys 126, which may be used when generating randomized portions of digits for OTPs.

In various embodiments, service provider server 120 includes at least one network interface component 128 adapted to communicate client device 110 and/or secondary device 140 over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Secondary device 140 may be implemented as a communication device that may utilize appropriate hardware and software configured for wired and/or wireless communication with client device 110 and/or service provider server 120. For example, in one embodiment, secondary device 140 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein. Secondary device 140 may correspond to a device associated with a user for client device 110, which may be designated to receive OTPs in place of client device 110. This may include messages and communications, such as text messages, having a randomized portion of an OTP and/or instruction for completing the OTP with a known portion for use of the OTP with multifactor authentication 114 of client device 110. In this regard, secondary device 140 may correspond to a mobile smart phone, wearable computing device, device of a family or trusted user, work device, or the like that the user has designated to receive messages for multifactor authentication to add additional security.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
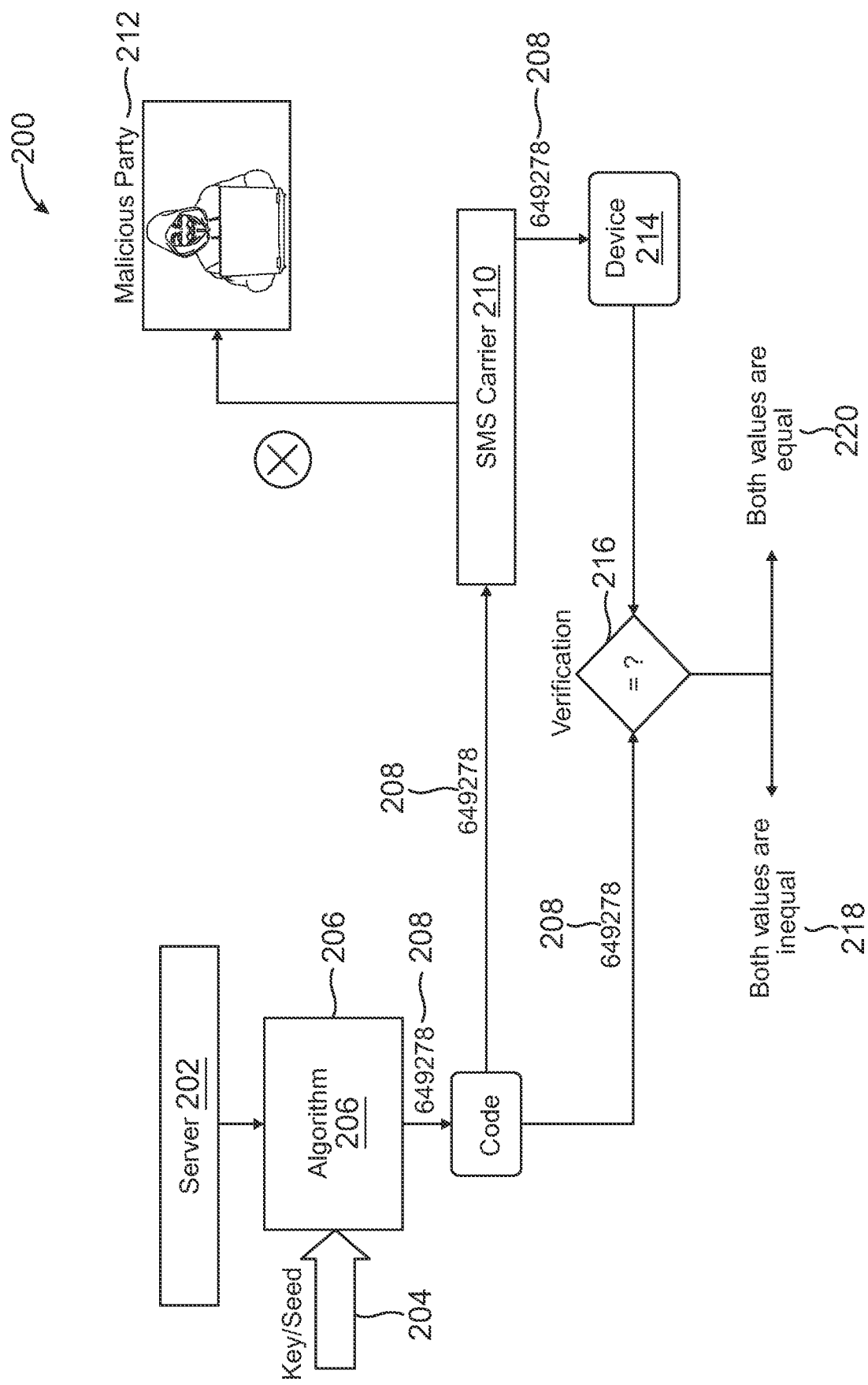
FIG. 2 is an exemplary diagram of system environment for providing one-time passwords to users that may be used by a service provider to provide split one-time password generation and use, according to an embodiment.

FIG. 2 is an exemplary diagram 200 of system environment for providing one-time passwords to users that may be used by a service provider to provide split one-time password generation and use, according to an embodiment. Diagram 200 includes a server 202 corresponding to one or more servers, devices, and/or components of service provider server 120 discussed in reference to system 100 of FIG. 1. Further, diagram 200 includes a device 214 corresponding to one or more of client device 110 and/or secondary device 140 discussed in reference to system 100, which may be used to receive a randomized portion of an OTP and/or instructions to complete and enter the OTP. In this regard, a user may utilize device 214 to interact with server 202 for entering a split OTP having randomized and known portions.

In diagram 200, server 202 may initially receive an authentication request and determine that the authentication request required multifactor authentication using an OTP schema, which may include a split OTP schema discussed herein. In order to provide multifactor authentication, such as a two- or more-factor authentication using at least authentication credentials and an OTP, server 202 may initially utilize a key/seed 204 with an algorithm 206 to generate a randomized portion or code having a number of digits for an OTP. With a split OTP, server 202 may utilize this randomized portion with a known portion placed in selected and/or instructed placements in the OTP, which may replace digits of the randomized portion or add digits to the randomized portion. Algorithm 206 may correspond to a HMAC or other hash algorithm that may use a seed value and/or encryption key from seed/key 204 to randomize digits for an OTP 208 corresponding to the required code for entry in the multifactor authentication.

In diagram 200, OTP 208 is shown with a randomized portion 649278, which is split in transmission by server 202 to an SMS carrier 210 and to a verification operation 216. SMS carrier 210 may correspond to a telecommunications carrier, including mobile telecommunications carriers that provide subscription-based and/or prepaid usage-based telecommunication services to users. This may include use of 3G, 4G, 4G LTE, 5G networks, as well as use of publicly switched telephone network (PTSN) services, VoIP, VoLTE, SMS/MMS texting, and the like. However, a malicious party 212 may interfere, eavesdrop, or other misappropriate, steal, and/or gain access to OTP 208. This may occur from eavesdropping attacks, account takeovers, device hacking, SIM swapping, and the like. Thus, as OTP 208 is transmitted to device 214, OTP 208 may become compromised and may be entered to device 214 and/or another device fraudulently by malicious party 212, where the malicious party is unauthorized to perform the multifactor authentication using OTP 208 to receive the access and/or computing services or operations requested when performing the multifactor authentication.

Verification 216 may correspond to one or more processes or operations to verify that OTP 208 is properly entered and corresponds to the randomized digits generated by server 202 from key/seed 204 and algorithm 206. Verification 216 may correspond to an internal and/or external process or application for server 202 to verify the multifactor authentication and OTP 208. Verification 216 may use OTP 208, including the randomized digits. However, verification 216 may also utilize a pre-established and known number of digits with the randomized digits to verify OTP 208. In this regard, device 214 may further be required to enter the known digits in placements that replace or add to the randomized digits for OTP 208. Once verification receives OTP 208, authentication may be processed where for unequal values 218, authentication is denied, and for equal values 220, authentication is authorized and provided.

Figure 3A:
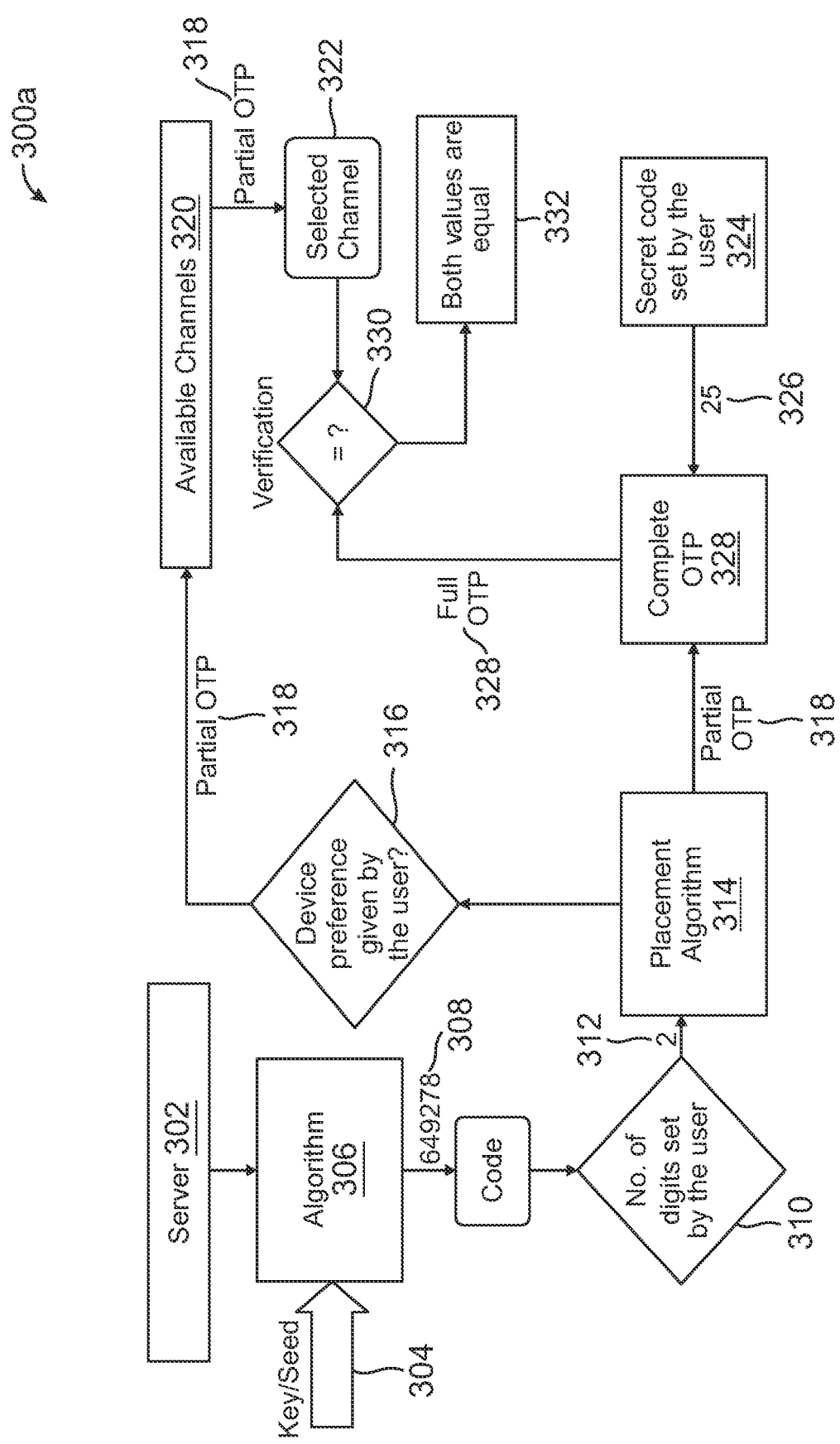
FIG. 3A is an exemplary diagram of system environment having a service provider that utilize split one-time passwords for multifactor authentication, according to an embodiment.

FIG. 3A is an exemplary diagram 300a of system environment having a service provider that utilizes split one-time passwords for multifactor authentication, according to an embodiment. Diagram 300a includes a server 302 corresponding to one or more servers, devices, and/or components of service provider server 120 discussed in reference to system 100 of FIG. 1. Further, diagram 300a includes a selected channel 322 for a communication channel that provides a message or communication to a device corresponding to one or more of client device 110 and/or secondary device 140 discussed in reference to system 100. This device that receives communications via selected channel 322 may be used to receive a randomized portion of an OTP and/or instructions to complete and enter the OTP. In this regard, a user may utilize selected channel 322 to respond with a complete OTP 328 to server 302 for authenticating a split OTP having randomized and known portions.

In diagram 300a, server 302 may initially receive an authentication request and determine that the authentication request required multifactor authentication using a split OTP schema discussed herein. In order to provide multifactor authentication using a split OTP that includes a portion randomized and communicated by server 302 and a portion known and entered via selected channel 322, server 202 may initially utilize a key/seed 304 with an algorithm 306 to generate a randomized portion or code having a number of digits for an OTP. This may be performed in a similar manner to that discussed in reference to diagram 200 of FIG. 2, such as using a HMAC or other MAC-based algorithm with a seed value, encryption key and/or the like. Thus, randomized digits 308 are output by server 302 using key/seed 304 and algorithm 306 and shown as 649278 in diagram 300a. Randomized digits 308 may therefore be used with a split OTP (e.g., complete OTP 328) as the portion of complete OTP 328 that is randomized and provided by server 302.

Thereafter, server 302 may be required to determine a number of digits 310 set by the user for their pre-established known portion or code of digits used for OTPs. For example, a secret code 324 may be set by the user requesting the multifactor authentication to access an account and/or utilize a computing service. Set digit placements 312 for secret code 324 include two digits shown in diagram 300a. Set digit placements 312 are provided with randomized digits 308 to a placement algorithm 314 that determines where set digit placements 312 are placed and/or required to be added, combined, and/or replaced with randomized digits 308 so that complete OTP 328 may be created and entered for the multifactor authentication. Placement algorithm 314 may determine that the number of digits, two, of set digit placements 312 in randomized digits 308 are removed and replaced with the digits of secret code 324. This may be based on rules and strategies implemented for the multifactor authentication and/or based on user preferences and settings for the multifactor authentication. Placement algorithm 314 may randomize the two placements for the digits of secret code 324 in randomized digits 308, which may be consecutive, non-consecutive, and/or in a forward or reverse order. For example, randomized digits 308 removing two digits and having the user enter secret code 324 may appear as "64**78" for known digits 326, shown as 25 in diagram 300a, of secret code 324 to be entered as "642578".

In further embodiments, placement algorithm 314 may allow the user to replace, either in specifically designated placements or locations of randomized digits 308, the digits of randomized digits 308 with secret code 324. The user may choose the two placements to remove digits and replace with the corresponding digits of secret code 324. This may be performed in consecutive or non-consecutive placements. In other embodiments, complete OTP 308 may include more digits than randomized digits 308. In such embodiments, set digit placements 312 may be determined to be prepended and/or appended to randomized digits 308. For example, known digits 326 of 25 may be prepended as "25649278", appended as "64927825", and/or split between prepending and appending as "26492785". In other embodiments, letter, numbers, and/or symbols of a password or other secret set for secret code may also be used, such as where a password may include "k j", the first and last letters of the password may be prepended, appended, and/or split between prepending and appending (e.g., "k649278j").

In some embodiments, the user may have more than one secret code, and secret code 324 may be determined by server 302 for use with complete OTP 328 based on a randomization, rotation, preference by the user, location of the user, type of corresponding authentication being requested (e.g., account access, transaction approval and payment flow, etc.), a number of allowable digits for the multifactor authentication, and/or another factor. Placement algorithm 314 may also select placements and/or the corresponding secret code based on system capabilities and other factors for the multifactor authentication. In this regard, each different secret code may have a different digits and type of digits (e.g., letters, numbers, symbols, etc.) and/or a different number of digits. The secret code may also include icons, emojis, digits representing symbols (e.g., <3 for love or heart, a smiley face using :) and the like), images, gifs or animated images, and other types of media. The secret code may also include other types of inputs including audio and/or video that may be provided by a user.

After determining how complete OTP 328 will be completed and entered using randomized digits 308 from server 302 and known digits 326 from secret code 324, a device preference 316 may be determined. The device preference may correspond to a device and/or corresponding communication channel to transmit a partial OTP 318 over based on the output of placement algorithm 314 for randomized digits 308. For example, device preference 316 may correspond to a main computing device (e.g., personal computer, laptop, mobile smart phone, etc.), as well as secondary devices (e.g., mobile smart phone, wearable computing device, device of a family or trusted user, work device, etc.). This may be based on available channels 320 for the user and/or corresponding service provider transmitting partial OTP 318.

A message or communication with partial OTP 318 may be transmitted over text message, email, network message and communication, instant message, push notification, and the like. Partial OTP 318 may correspond to randomized digits 308 in full or having digits removed for replacement with known digits 326. Thereafter, selected channel 322 may receive partial OTP 318, as well as any necessary instruction for entering complete OTP 328 having known digits 326 with partial OTP 318. The user may respond by entering digits that they believe correspond to complete OTP 328 and transmitting a message. Malicious actors and entities may engage in race-condition attacks, where malicious actors attempt a large of number attacks by entering different OTPs in a very short amount of time (e.g., 10 ms) before rate limiting may be initiated (e.g., to limit more than a certain number of entries in 30 ms). In some embodiment, server 302 may prevent from these race-condition attacks by breaking up complete OTP 328 sent by the user into two or more different messages, which may be transmitted in succession. These messages may be required to be sent over a time period that allows rate limiting to take effect. This may be done by asking the user to enter two different portions of the code or may be automatically split by the corresponding application and/or operations for the multifactor authentication transparently to the user. In some embodiments, the user may be further required to wait a time period before and/or after entering a code and/or a portion of the code, which may allow rate limiting protections to be implemented.

One or more messages with complete OTP 328 may then be transmitted to a verification 330, which may process complete OTP 328 to determine if the correct portions for partial OTP 318 and secret code 324 are present in complete OTP 328 and in their proper placements (e.g., completed based on the requirements and instructions from placement algorithm 314). Thereafter, if equal values 332 are present, authentication may be approved and access and/or service use may be provided. However, if not, multifactor authentication may be retried, alerts may be generated, and/or resetting of authentication credentials including secret code 324 may be required.

Figure 3B:
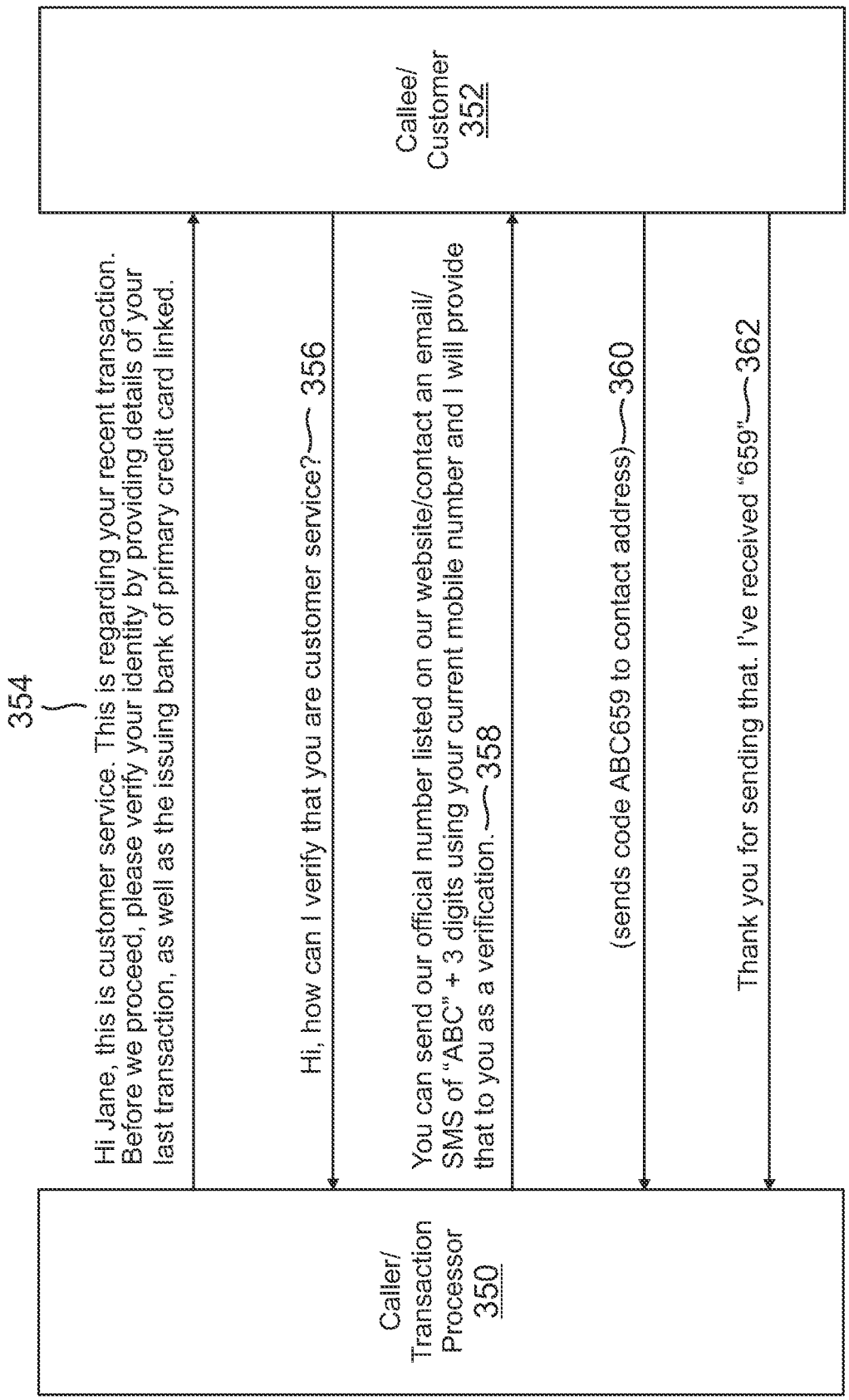
FIG. 3B is an exemplary diagram of interactions between a caller and a callee for using split one-time passwords during voice communications, according to an embodiment.

FIG. 3B is an exemplary diagram 300b of interactions between a caller and a callee for using split one-time passwords during voice communications, according to an embodiment. Diagram 300b of FIG. 3B includes a caller/transaction processor 350 corresponding to one or more servers, devices, and/or components, as well as a corresponding caller as an agent or employee, of service provider server 120 discussed in reference to system 100 of FIG. 1. Further, diagram 300b includes a callee/customer corresponding to a user associated with client device 110 discussed in reference to system 100. In this regard, callee/customer 352 may receive a phone call or other voice communications from caller/transaction processor 350, which may utilize a known OTP exchanged during the voice communications to verify an identity of caller/transaction processor 350.

At a first interaction 354, a callee/customer 352 is contacted by a caller/transaction processor 350. For example, caller/transaction processor 350 may reach out via a phone call, voice communication session, instant or text message, or the like to communicate with callee/customer 352. However, a fraudster may engage in this type of spam communication and phishing attacks to discover sensitive and/or financial data or engage in fraud. Caller/transaction processor 350 is not able to immediately provide authenticating and/or identification information to callee/customer 352. Thus, at a second interaction 356, callee/customer 352 inquires how caller/transaction processor 350 may verify their identity as a customer support agent validly working with the transaction processor or other service provider.

In such embodiments, at a third interaction 358, caller/transaction processor 350 provides a method to authenticate their identity and/or validate that they work on behalf of the transaction processor or other service provider. This method includes providing a portion of an OTP generated by caller/transaction processor 350 (which may be randomized or entered by the agent or other employee for caller/transaction processor 350). For example, at third interaction 358, caller/transaction processor 350 provides "ABC" during the voice communication to callee/customer 352 as an identifier that identifies the particular caller/agent for caller/transaction processor 350. Further, caller/transaction processor 350 requests that callee/customer 352 enter in their own portion for the OTP, which may be generated by the corresponding user and/or used from a known portion or code. In this example, callee/customer 352 is instructed to enter three digits.

At a fourth interaction 360, callee/customer 352 may then enter three digits with ABC from caller/transaction processor 350 to create and combine the split OTP, shown in diagram 300b as "659". Thereafter during fourth interaction 360, callee/customer 352 transmits the full OTP having "ABC659" to a known address or phone number or enters the OTP to a trusted website or application interface. The backend system for caller/transaction processor 350 may then receive the split OTP and may route the split OTP to caller/transaction processor 350. The split OTP may be populated in a user interface and/or output during the communication session occurring in diagram 300b. Caller/transaction processor 350 may then view the split OTP of "ABC659", verify that callee/customer 352 entered the provided "ABC" portion, and, at a fifth interaction 362, may repeat back to callee/customer 352 the "659" portion entered by callee/customer 352. This then allows callee/customer 352 to authenticate caller/transaction processor 350 and verify their identity.

In other embodiments, callee/customer 352 may visit a website or call a phone number that is known for transaction processor or other service provider. In such embodiments, callee/customer 352 may then request verification of caller/transaction processor 350 from a live agent, chatbot, and/or interactive voice response (IVR) system. Callee/customer 352 may provide a phone number for caller/transaction processor 350 and/or a code or identifier provided during the phone call (e.g., the ABC or other OPT provided by caller/transaction processor 350). This provided OTP may then be used to validate and authenticate caller/transaction processor 350 with a trusted agent, chatbot, or IVR system.

Figure 4:
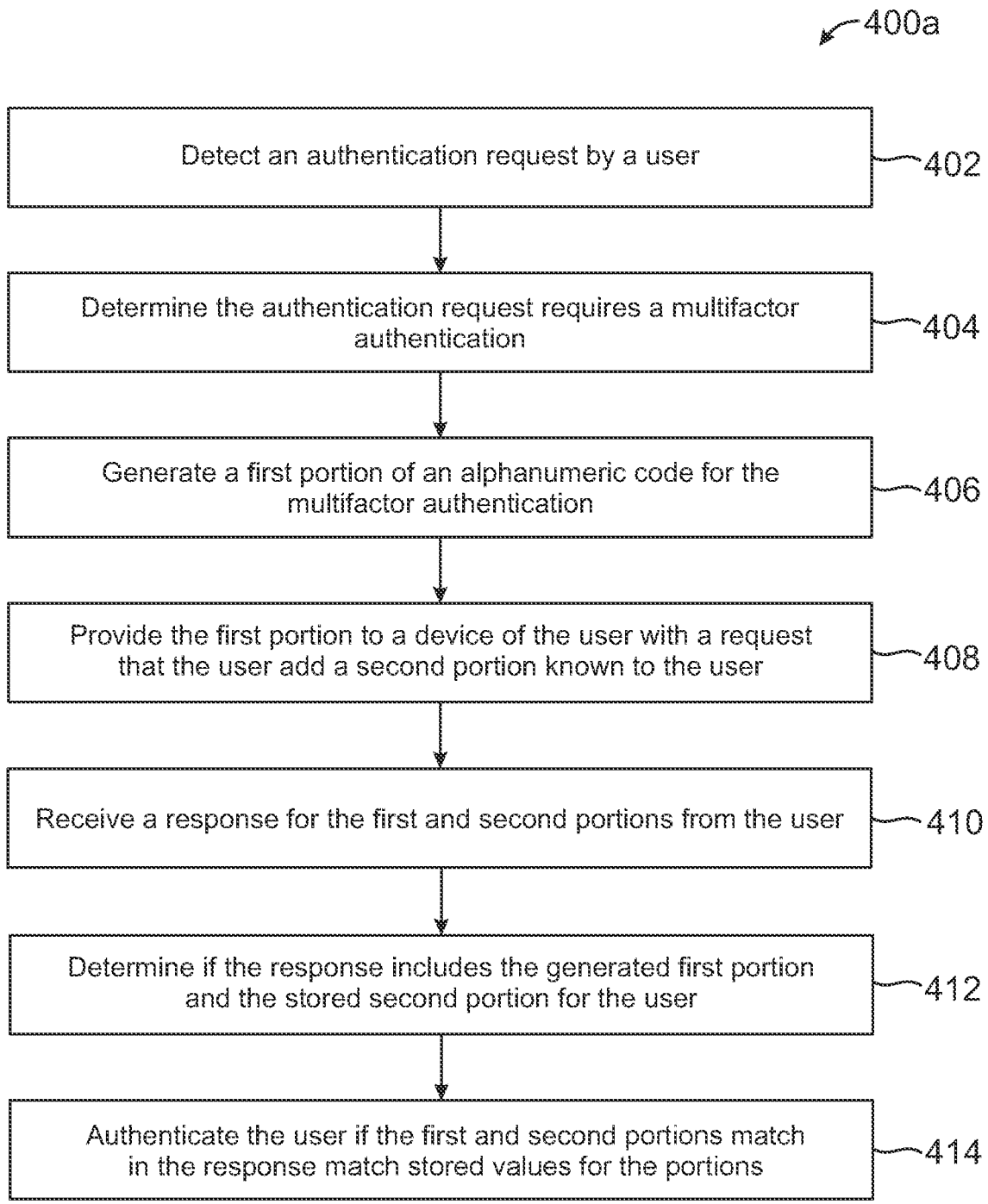
FIG. 4 is a flowchart for using split one-time password digits for secure transmissions to selected devices, according to an embodiment.

FIG. 4 is a flowchart 400 for using split one-time password digits for secure transmissions to selected devices, according to an embodiment. Note that one or more steps, processes, and methods described herein of flowchart 400 may be omitted, performed in a different sequence, or combined as desired or appropriate.

At step 402 of flowchart 400, an authentication request by a user is detected. The authentication request may correspond to a request to access a digital account and/or perform a computing service including electronic transaction processing for a payment or transfer to a merchant, another user, or the like, such as data or account access. At step 404, the authentication request is determined to require multifactor authentication. Multifactor authentication may be required by a corresponding service provider for the account login and/or to utilize the computing service. In further embodiments, the user for the account and/or corresponding data of the computing service may establish that multifactor authentication is required for the authentication. In such embodiments, the user may further establish what type of multifactor authentication is required. The multifactor authentication may be determined to be a split OTP multifactor authentication, which may require a randomized portion of digits and a pre-established known portion.

At step 406, a first portion of an alphanumeric code for the OTP is generated for the multifactor authentication. The first portion may be generated using a hash algorithm or function, which may generate randomized digits. This may be generated from a seed and/or key used with the corresponding algorithm. At step 408, the first portion is provided to a device of the user with a request that the user add a second portion known to the user. The first portion may be provided with instructions generated based on a rule, strategy, and/or user preference. The user may be informed of a process to combine the first portion with the second portion to generate and enter the alphanumeric code for the OTP. Further, the device may be selected for the user based on preferences for the user for devices to receive OTPs and/or split OTPs, which may include a primary device used by the user and/or one or more secondary devices. Where multiple devices may have different preferences, additional contextual data may be used to select the corresponding device.

At step 410, a response for the first and second portions from the user is received. The response may correspond to an entry for the alphanumeric code corresponding to the OTP and may be transmitted in response to the multifactor authentication process for the authentication request and the transmission of the first portion to the device of the user. At step 412, it is determined if the response includes the generated first portion and the stored second portion. The determination of whether the first and second portions are included in the response may be based on the instruction for entering the OTP based on what digits are required from the first and second portions. All digits may be required from each portion, or a subset of digits may be required from the first and/or second portions. This may also include determining whether the instructions to complete the OTP have been properly followed when providing the first and second portions.

At step 414, the user is authenticated if the first and second portions in the response match stored values for the portions. Thus, the service provider may determine whether the input required for the OTP is correct based on the generated and/or randomized digits created specifically for the multifactor authentication and the stored digits set by the user for OTPs. However, if no match occurs, the user may not be authenticated and may retry authentication, or alerts and password reset operations may be implemented. In various embodiments, the user may designate placements of the second portion known to the user in OTPs with the corresponding service provider, such as the third and fifth places in a six-digit OTP. The user may provide multiple different strategies for completing the OTP, which may also be linked to different stored second portions that have different numbers of digits (e.g., two or three digits). Thus, the strategies may be known to the user without the service provider transmitting instructions for completion of the OTP by the user.

Figure 5:
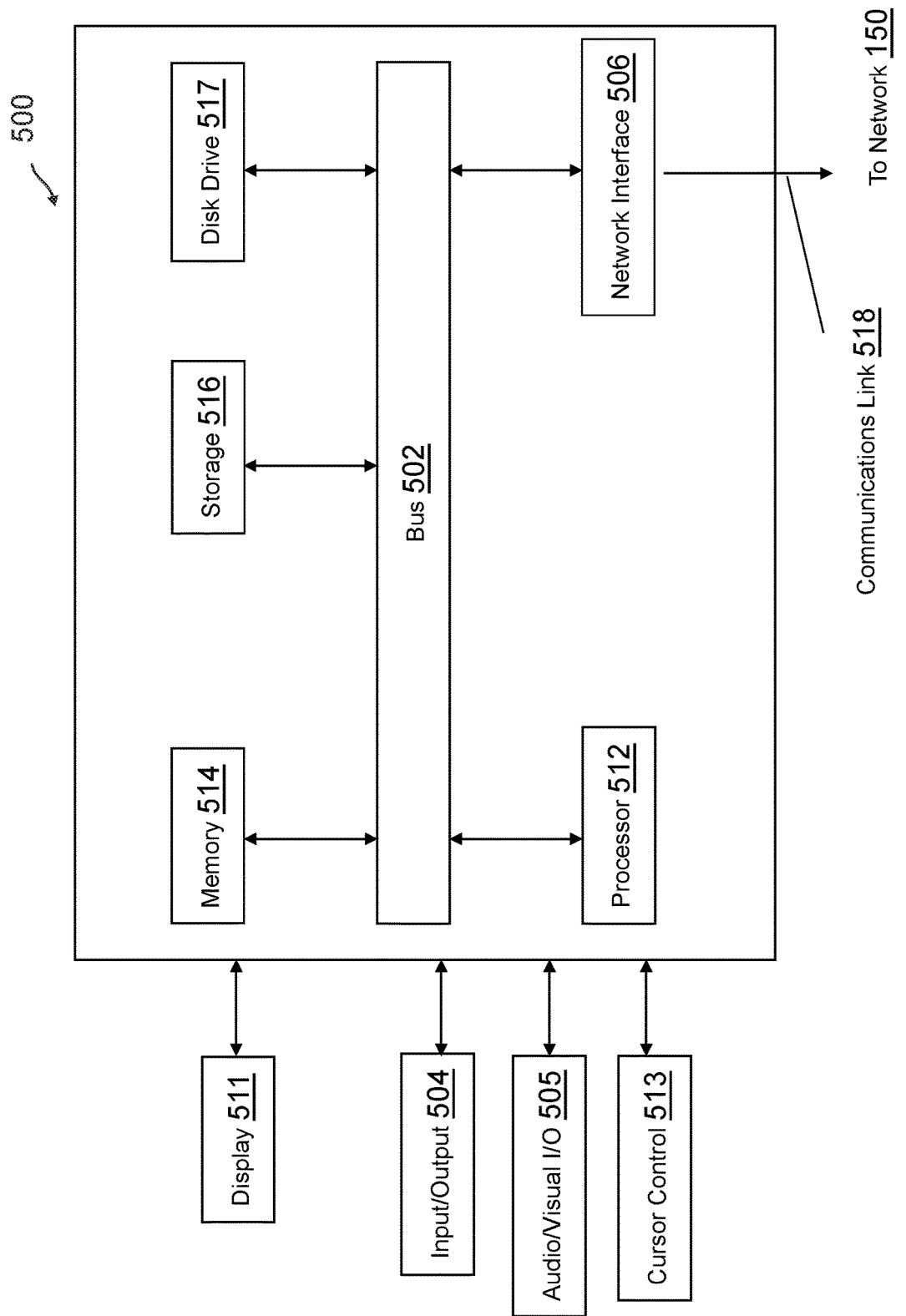
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output component 505 may also be included to allow a user to use voice for inputting information by converting audio signals and/or use video to capture still or video images and provide video input. Audio I/O component 505 may allow the user to hear audio and/or view video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
a non-transitory memory; and
one or more hardware processors coupled to the non-transitory memory and configured to read instructions from the non-transitory memory to cause the service provider system to perform operations comprising:
receiving an authentication request from a device associated with a user;
determining that the authentication request requires a two-factor authentication that requests entry of an alphanumeric code during a processing of the authentication request;
generating a first portion of the alphanumeric code using a code generation operation of the two-factor authentication, wherein the first portion of the alphanumeric code reserves a second portion of the alphanumeric code comprising a number of characters of the alphanumeric code for an entry by the user for the two-factor authentication;
generating the alphanumeric code using the first portion and the second portion based on a randomized placement of the first portion with the second portion, wherein the alphanumeric code is generated with instructions for an entry of the first portion and the second portion by the user to the authentication request based on the randomized placement; and
transmitting, to the user via one of the device or a secondary device associated with the user, the first portion of the alphanumeric code with a request for the entry of the first portion and the second portion to complete the entry of the alphanumeric code during the processing of the authentication request, wherein the request includes the instructions and identifies the randomized placement for the user to enter the second portion respective to the first portion when completing the entry of the alphanumeric code for the authentication request.

2. The service provider system of claim 1, wherein the operations further comprise:
receiving a response to the authentication request from the device during the processing of the authentication request;
determining whether the response comprises the alphanumeric code having the first portion and the second portion; and
determining whether to authenticate the user based on whether the response comprises the alphanumeric code having the first portion and the second portion.

3. The service provider system of claim 2, wherein the response is determined to comprise the alphanumeric code having the first portion and the second portion, and wherein the user is authenticated and is provided access to a digital account with the service provider system or allowed to conduct a transaction using the digital account.

4. The service provider system of claim 2, wherein the randomized placement comprises one of a plurality of randomized placements and the response comprises the second portion split in the plurality of randomized placements respective to the first portion of the alphanumeric code, and wherein the determining whether to authenticate the user comprises determining whether the entry of the second portion in the plurality of randomized placements respective to the first portion matches the second portion stored by the service provider system for the user.

5. The service provider system of claim 2, wherein the response is determined to not comprise the alphanumeric code having at least one of the first portion or the second portion, and wherein the operations further comprise:
determining that the user has failed a plurality of two-factor authentications over a time period; and
requesting that the user replace the second portion with one or more new alphanumeric characters.

6. The service provider system of claim 1, wherein the generating the first portion of the alphanumeric code comprises:
determining input seed data and a cryptographic key for a hash function;
generating a randomized alphanumeric code using the input seed data, the cryptographic key, and the hash function;
removing the number of characters from the randomized alphanumeric code; and generating the first portion based on the randomized alphanumeric code having the number of characters removed, wherein the second portion completes the alphanumeric code from the entry of the second portion with the first portion.

7. The service provider system of claim 1, wherein prior to receiving the authentication request, the operations further comprise:
   receiving a request to establish the second portion from the user, wherein the request further identifies whether the second portion replaces alphanumeric characters for the alphanumeric code or is appended to a placement of the alphanumeric code; and
   establishing the second portion for the user with the service provider system.

8. The service provider system of claim 7, wherein the receiving and the establishing are performed during an account setup for an account of the user for the two-factor authentication with the service provider system.

9. The service provider system of claim 8, wherein the account setup further enables the user to establish one or more third portions usable for the two-factor authentication with the second portion, and wherein the second portion and the one or more third portions comprise at least one of different alphanumeric characters or different numbers of characters.

10. The service provider system of claim 1, wherein the first portion of the alphanumeric code and the request are transmitted to the one of the device or the secondary device based on an account preference for device transmission of the first portion for the two-factor authentication.

11. A method comprising:
    receiving an authentication request from a device associated with a user;
    determining that the authentication request requires a two-factor authentication that requests entry of an alphanumeric code during a processing of the authentication request;
    generating a first portion of the alphanumeric code using a code generation operation of the two-factor authentication, wherein the first portion of the alphanumeric code reserves a second portion of the alphanumeric code comprising a number of characters of the alphanumeric code for an entry by the user for the two-factor authentication;
    generating the alphanumeric code using the first portion and the second portion based on a randomized placement of the first portion with the second portion, wherein the alphanumeric code is generated with instructions for an entry of the first portion and the second portion by the user to the authentication request based on the randomized placement; and
    transmitting, to the user via one of the device or a secondary device associated with the user, the first portion of the alphanumeric code with a request for the entry of the first portion and the second portion to complete the entry of the alphanumeric code during the processing of the authentication request, wherein the request includes the instructions and identifies the randomized placement for the user to enter the second portion respective to the first portion when completing the entry of the alphanumeric code for the authentication request.

12. The method of claim 11, further comprising:
    receiving a response to the authentication request from the device during the processing of the authentication request;
    determining whether the response comprises the alphanumeric code having the first portion and the second portion; and
    determining whether to authenticate the user based on whether the response comprises the alphanumeric code having the first portion and the second portion.

13. The method of claim 12, wherein the response is determined to comprise the alphanumeric code having the first portion and the second portion, and wherein the user is authenticated and is provided access to a digital account with a service provider system or allowed to conduct a transaction using the digital account.

14. The method of claim 12, wherein the randomized placement comprises one of a plurality of randomized placements and the response comprises the second portion split in the plurality of randomized placements respective to the first portion of the alphanumeric code, and wherein the determining whether to authenticate the user comprises determining whether the entry of the second portion in the plurality of randomized placements respective to the first portion matches the second portion stored by the service provider system for the user.

15. The method of claim 12, wherein the response is determined to not comprise the alphanumeric code having at least one of the first portion or the second portion, and wherein the method further comprises:
    determining that the user has failed a plurality of two-factor authentications over a time period; and
    requesting that the user replace the second portion with one or more new alphanumeric characters.

16. The method of claim 11, wherein the generating the first portion of the alphanumeric code comprises:
    determining input seed data and a cryptographic key for a hash function;
    generating a randomized alphanumeric code using the input seed data, the cryptographic key, and the hash function;
    removing the number of characters from the randomized alphanumeric code; and
    generating the first portion based on the randomized alphanumeric code having the number of characters removed, wherein the second portion completes the alphanumeric code from the entry of the second portion with the first portion.

17. The method of claim 11, wherein prior to receiving the authentication request, the method further comprises:
    receiving a request to establish the second portion from the user, wherein the request further identifies whether the second portion replaces alphanumeric characters for the alphanumeric code or is appended to a placement of the alphanumeric code; and
    establishing the second portion for the user with a service provider system.

18. The method of claim 17, wherein the receiving and the establishing are performed during an account setup for an account of the user for the two-factor authentication with the service provider system.

19. The method of claim 18, wherein the account setup further enables the user to establish one or more third portions usable for the two-factor authentication with the second portion, and wherein the second portion and the one or more third portions comprise at least one of different alphanumeric characters or different numbers of characters.

20. A non-transitory machine-readable medium having stored thereon machine-readable instructions executable to cause a machine to perform operations comprising:

receiving an authentication request from a device associated with a user;

determining that the authentication request requires a two-factor authentication that requests entry of an alphanumeric code during a processing of the authentication request;

generating a first portion of the alphanumeric code using a code generation operation of the two-factor authentication, wherein the first portion of the alphanumeric code reserves a second portion of the alphanumeric code comprising a number of characters of the alphanumeric code for an entry by the user for the two-factor authentication;

generating the alphanumeric code using the first portion and the second portion based on a randomized placement of the first portion with the second portion, wherein the alphanumeric code is generated with instructions for an entry of the first portion and the second portion by the user to the authentication request based on the randomized placement; and transmitting, to the user via one of the device or a secondary device associated with the user, the first portion of the alphanumeric code with a request for the entry of the first portion and the second portion to complete the entry of the alphanumeric code during the processing of the authentication request, wherein the request includes the instructions and identifies the randomized placement for the user to enter the second portion respective to the first portion when completing the entry of the alphanumeric code for the authentication request.

\* \* \* \* \*